United States Patent
Mizumoto et al.

(10) Patent No.: US 10,005,210 B2
(45) Date of Patent: Jun. 26, 2018

(54) INJECTION MOLDED ELEMENT FOR SLIDE FASTENER AND SLIDE FASTENER PROVIDED WITH SAME

(71) Applicant: YKK Corporation, Tokyo (JP)

(72) Inventors: Kazuya Mizumoto, Toyama (JP); Hiroaki Matsumoto, Toyama (JP); Masayoshi Kojima, Toyama (JP)

(73) Assignee: YKK Corporation (JP)

( * ) Notice: Subject to any disclaimer, the term of this patent is extended or adjusted under 35 U.S.C. 154(b) by 417 days.

(21) Appl. No.: 14/654,626

(22) PCT Filed: Apr. 22, 2013

(86) PCT No.: PCT/JP2013/061797
§ 371 (c)(1),
(2) Date: Jun. 22, 2015

(87) PCT Pub. No.: WO2014/174577
PCT Pub. Date: Oct. 30, 2014

(65) Prior Publication Data
US 2015/0343681 A1 Dec. 3, 2015

(51) Int. Cl.
| | |
|---|---|
| *B29C 45/00* | (2006.01) |
| *A44B 19/06* | (2006.01) |
| *A44B 19/24* | (2006.01) |
| *A44B 19/42* | (2006.01) |
| *B29D 5/02* | (2006.01) |
| *B29L 5/00* | (2006.01) |
| *B29K 77/00* | (2006.01) |
| *B29K 105/12* | (2006.01) |
| *B29K 309/08* | (2006.01) |

(52) U.S. Cl.
CPC .......... *B29C 45/0001* (2013.01); *A44B 19/06* (2013.01); *A44B 19/24* (2013.01);
(Continued)

(58) Field of Classification Search
CPC ........ B29C 45/0001; B29C 2045/0093; A44B 19/06; A44B 19/24; A44B 19/42;
(Continued)

(56) References Cited

U.S. PATENT DOCUMENTS

| | | | |
|---|---|---|---|
| 6,056,901 A | 5/2000 | Hamatani et al. | |
| 2003/0055143 A1 | 3/2003 | Mori et al. | |
| 2010/0113657 A1 | 5/2010 | Seki | |

FOREIGN PATENT DOCUMENTS

| | | |
|---|---|---|
| JP | 11-070588 A | 3/1999 |
| JP | 2001-192530 A | 7/2001 |

(Continued)

OTHER PUBLICATIONS

JP2005-160667A—machine translation.*

(Continued)

*Primary Examiner* — Ling Siu Choi
*Assistant Examiner* — Ronald Grinsted
(74) *Attorney, Agent, or Firm* — Kilpatrick Townsend & Stockton LLP

(57) ABSTRACT

Provided is an injection molded element for a slide fastener which retains a high degree of practical strength, which does not cause undulation of a fastener tape after attachment thereto, and which has superior moldability. The present invention is an injection molded element for a slide fastener having as a material a polyamide resin composition containing a polyamide resin having a glass transition temperature from 40 to 70° C., the composition having a melt flow rate from 5 to 40 g/10 min, and containing from 40 to 60 parts by mass of the reinforcing fibers per 100 parts by mass in total of the polyamide resin and reinforcing fibers.

10 Claims, 1 Drawing Sheet

Figure 1:
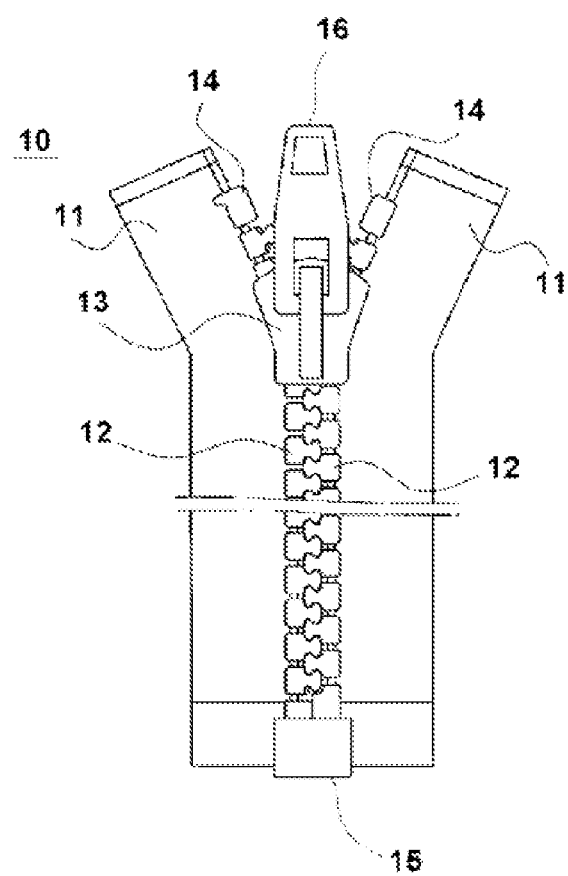

(52) U.S. Cl.
CPC ............... *A44B 19/42* (2013.01); *B29D 5/02* (2013.01); *B29C 2045/0093* (2013.01); *B29K 2077/00* (2013.01); *B29K 2105/12* (2013.01); *B29K 2309/08* (2013.01); *B29L 2005/00* (2013.01); *Y10T 24/25* (2015.01)

(58) Field of Classification Search
CPC ....... B29D 5/02; Y10T 24/25; B29K 2077/00; B29K 2105/12; B29K 2309/08; B29L 2005/00
USPC .......................................................... 524/381
See application file for complete search history.

(56) References Cited

FOREIGN PATENT DOCUMENTS

| | | | |
|---|---|---|---|
| JP | 2003-219903 A | | 8/2003 |
| JP | 2005160667 A | * | 6/2005 |
| JP | 2005-314612 A | | 11/2005 |
| JP | 4517277 B2 | | 8/2010 |
| JP | 2013-040269 A | | 2/2013 |

OTHER PUBLICATIONS

Sigma Aldrich—Thermal Transitions of Homopolymer: Glass Transitions and Melting Points (www.sigmaaldrich.com/content/dam/sigma-aldrich/docs/Aldrich/General_Information/thermal_transitions_of_homopolymers.pdf Downloaded—Sep. 17, 2017 Online—Sep. 8, 1999.*
Misumi Technical Tutorial—Melt Flow Rate (MFR) of Plastics—www.misumi_techcentral.com/tt/en/mold/2012/01/107.html Downloaded—Sep. 17, 2017 Online—Jan. 13, 2012.*
International Search Report, PCT Application No. PCT/JP2013/061797, dated Jul. 23, 2013.
Supplementary European Search Report, European Patent Application No. 13883055.9, dated Sep. 28, 2016.
International Preliminary Report on Patentability, PCT Application No. PCT/JP2013/061797, dated Nov. 5, 2015.

* cited by examiner

INJECTION MOLDED ELEMENT FOR SLIDE FASTENER AND SLIDE FASTENER PROVIDED WITH SAME

This application is a national stage application of PCT/JP2013/061797, which is incorporated herein by reference.

TECHNICAL FIELD

The present invention relates to an injection molded element for a slide fastener. The present invention also relates to a slide fastener provided with this injection molded element.

BACKGROUND ART

Slide fasteners are used not only in everyday items such as clothing, bags, footwear, and sundry goods, but also as opening/closing tools in industrial products such as water storage tanks, fishing nets, and spacesuits.

FIG. 1 shows an example of a slide fastener. A slide fastener 10 has three main components: a pair of tape strips 11, elements 12 serving as the engaging parts of the fastener attached to the side edges of both tape strips, and a slider 13 controlling the opening and closing of the fastener by engaging and separating elements 12. In order to keep the slider 13 from sliding off, a top stop 14 and opening device 15 can also be provided. A pull tab 16 can be attached to the surface of the slider 13.

When the elements are made of a synthetic resin, the elements can be attached to the fastener tape by continuously injection molding them on the tape. The synthetic resin is usually polyoxyethylene (Patent Document 1 and Patent Document 2), but materials other than polyoxyethylene have been proposed as a means of improving performance A slide fastener component has been proposed in Patent Document 3 which uses polyester and polyamide to impart the same apparent color to the fabric and the slide fastener when the slide fastener composed of the fabric and the resin components are dyed in the same bath.

PRIOR ART DOCUMENTS

Patent Documents

Patent Document 1: JP2003-219903A
Patent Document 2: JP2001-192530A
Patent Document 3: JP Patent No. 4517277

SUMMARY OF THE INVENTION

Problem Solved by the Invention

An injection molded element for a slide fastener is required to retain a high degree of practical strength, not to cause undulation of a fastener tape after attachment (a design feature), and to have superior moldability. Polyoxymethylene has excellent moldability, but is difficult to reinforce. Because adhesion to the tape is weak, the sliding properties of the elements often deteriorate.

While polyester and polyamide are used as element materials in Patent Document 3, the main purpose is to improve union dyeing properties. There has been insufficient research into finding a specific means of satisfying all of the requirements mentioned above. In particular, specific examples of polyamide resins being used in the elements have not been disclosed.

It is an object of the present invention to provide an injection molded element for a slide fastener that can satisfy all of the requirements mentioned above. It is another object of the present invention to provide a slide fastener provided with this injection molded element.

Means of Solving the Problem

The present inventors conducted extensive research to solve this problem and discovered that a polyamide resin composition having a melt flow rate (MFR) in a particular range was especially effective when a polyamide resin having a particular glass transition point (Tg) was compounded with reinforcing fibers. They also discovered that moldability could be improved without compromising strength by adding a particular fatty acid salt.

One aspect of the present invention, which is a product of these discoveries, is an injection molded element for a slide fastener having as a material a polyamide resin composition containing a polyamide resin having a glass transition temperature from 40 to 70° C., the composition having a melt flow rate from 5 to 40 g/10 min, and containing from 40 to 60 parts by mass of reinforcing fibers per 100 parts by mass in total of the polyamide resin and reinforcement fibers.

In one embodiment of the injection molded element according to the present invention, it also contains a metal salt of a fatty acid having from 20 to 40 carbon atoms.

In another embodiment of the injection molded element according to the present invention, the fatty acid salt is a montanic acid salt.

In another embodiment of the injection molded element according to the present invention, the fatty acid salt content is from 0.1 to 2.0 parts by mass per 100 parts by mass in total of the polyamide resin and reinforcing fibers.

In yet another embodiment of the injection molded element according to the present invention, the melt flow rate is from 10 to 20 g/10 min.

In yet another embodiment of the injection molded element according to the present invention, the polyamide resin is at least one type selected from among Nylon 6 and Nylon 6, 10.

In yet another embodiment of the injection molded element according to the present invention, the reinforcing fibers are at least one type selected from among glass fibers, carbon fibers, and aramid fibers.

Another aspect of the present invention is a fastener chain comprising an injection molded element according to the present invention.

Yet another aspect of the present invention is a slide fastener comprising an injection molded element according to the present invention.

Yet another aspect of the present invention is an article comprising the slide fastener according to the present invention.

Effect of the Invention

The present invention is able to provide a slide fastener retaining a high degree of strength, while having superior moldability and suppressing undulation of fastener tape.

BRIEF DESCRIPTION OF THE INVENTION

FIG. 1 is a front view showing an example of a slide fastener.

EMBODIMENT OF THE INVENTION (1. Polyamide Resin)

The material used in the injection molded element for a slide faster according to the present invention is a polyamide resin composition. Polyamide resins that can be used in the present invention have a glass transition point from 40 to 70°

C. When the glass transition point is equal to or greater than 40° C., high strength can be achieved. When the glass transition point is equal to or less than 70° C., injection molding can be performed at low temperatures. This can prevent the undulations that occur when heat from the injection molding process causes the fastener tape to contract. The glass transition point of the polyamide resin is preferably from 50 to 60° C.

In the present invention, the glass transition point of the polyamide resin is measured in accordance with JIS K 7121.

The polyamide resins are obtained by copolycondensation of a diamine and a dicarboxylic acid, polycondensation of ω-amino acids, or ring-opening polymerization of lactams. Examples of diamines include straight or branched chain aliphatic diamines such as ethylene diamine, propylene diamine, butylene diamine, hexamethylene diamine, 2-methyl propane diamine, 3-methyl propane diamine, octamethylene diamine, decane diamine, and dodecane diamine; aromatic diamines such as metaxylylene diamine, paraxylylene diamine, m-phenylene diamine, and p-phenylene diamine; and alicyclic diamines such as isophorone diamine, 2-amino-methyl piperidine, 4-amino-methyl piperidine, 4,4'-diaminodiphenyl dicyclohexylene methane, 4,4'-diamino-3,3'-dimethyl dicyclohexylene methane, 1,3-di(4-piperidyl)-propane, 1,2-diaminocyclohexane, 1,3-diaminocyclohexane, 1,4-diaminocyclohexane, N-aminopropyl piperazine, 4,4'-diamino dicyclohexylene propane, 1,2-bis(aminomethyl)cyclohexane, 1,3-bis(aminomethyl)cyclohexane, and 1,4-bis(aminopropyl)piperazine. Examples of dicarboxylic acids include straight or branched aliphatic dicarboxylic acids such as succinic acid, propanedioic acid, butanedioic acid, pentanoic acid, adipic acid, heptanoic acid, octanoic acid, nonanoic acid, decanoic acid, dodecanedioic acid, undecanedioic acid, dimer acid, and hydrogenated dimer acid; aromatic dicarboxylic acids such as phthalic acid, terephthalic acid, isophthalic acid, naphthalene dicarboxylic acid, 2-chloroterephthalic acid, 2-methyl terephthalic acid, 5-methyl isophthalic acid, 5-sodium sulfoisophthalic acid, and 1,5-naphthalene dicarboxylic acid; and dicarboxylic acids having a non-aromatic cyclic group such as 1,4-cyclohexane dicarboxylic acid, 1,2-cyclohexane dicarboxylic acid, 1,3-cyclohexane dicarboxylic acid, tetrahydrophthalic acid, tetrahydro phthalic anhydride, hexahydrophthalic acid, hexahydro phthalic anhydride, 3-methyl-1,2,3,6-tetrahydro phthalic anhydride, 4-methyl-1,2,3,6-tetrahydro phthalic anhydride, 3-methyl-1,2,3,6-tetrahydrophthalic acid, 4-methyl-1,2,3,6-tetrahydrophthalic acid, 3-methyl hexahydrophthalic anhydride, 4-methyl hexahydrophthalic anhydride, 3-methyl hexahydrophthalic acid, and 4-methyl hexahydrophthalic acid. Examples of ω-amino acids include 6-aminohexanoic acid, 11-aminoundecanoic acid, 12-aminododecanoic acid, 4-piperidine carboxylic acid, 3-piperidine carboxylic acid, and 2-piperidine carboxylic acid. Examples of lactams include ε-caprolactam, undecane lactam, and lauryl lactam.

Preferred examples of polyamides include polycaproamide (Nylon 6), polydodecanamide (Nylon 12), polyhexamethyleneadipamide (Nylon 66), polyundecamethyleneadipamide (Nylon 116), polyhexamethylene sebacamide (Nylon 610), polydecamethylene adipamide (Nylon 106), polydecamethylene sebacamide (Nylon 1010), polyhexamethylene dodecamide (Nylon 612), and polydecamethylene dodecamide (Nylon 1012). These can be used alone or in combinations of two or more. A copolymer with the desired combination of repeating polyamide units can also be used.

(2. Reinforcing Fibers)

The strength of the injection molded element can be reinforced by including reinforcing fibers in the polyamide resin composition. The polyamide can be surface-treated using a silane coupling agent, titanate coupling agent or aluminate coupling agent to improve its affinity to reinforcing fibers relative to polyester. In this way, rigidity can be improved without compromising strength even when a large amount of reinforcing fibers is used. More specifically, the concentration of reinforcing fibers can be at least 40 parts by mass, and it can also be at least 50 parts by mass, per 100 parts by mass in total of the polyamide resin and reinforcing fibers. When the concentration of reinforcing fibers is too high, moldability and strength both deteriorate. Therefore, the concentration of reinforcing fibers in the polyamide resin composition is preferably 70 parts by mass or less, and more preferably 65 parts by mass or less, relative to the total mass of the polyamide resin and reinforcing fibers.

There are no particular restrictions on the reinforcing fibers used in the present invention. Examples include organic fibers such as carbon fibers and aramid fibers, as well as inorganic fibers such as glass fibers, acicular wollastonite, and whiskers (calcium titanate whiskers, calcium carbonate whiskers, aluminum borate whiskers, etc.). From the standpoint of improving strength while maintaining the desired level of fluidity, the use of at least one type of fiber among glass fibers, aramid fibers, and carbon fibers is preferred. Glass fibers are especially preferred. These can be used alone or in combinations of two or more.

The average fiber diameter before compounding the fibers with the resin is preferably from 3 to 20 μm, and more preferably from 5 to 12 μm. The average fiber length before compounding the fibers with the resin is preferably from 1 to 10 mm, and more preferably from 3 to 6 mm. Here, the fiber diameter is calculated by determining the cross-sectional area of a reinforcing fiber and defined as a diameter of a perfect circle corresponding to the cross-sectional area. The aspect ratio of the fibers before compounding with the resin, which is the ratio of the average fiber diameter to the average fiber length, is preferably from 1:50 to 3:10,000, and preferably from 1:300 to 1:1,200. Once compounded with the resin and molded, the average fiber length of the reinforcing fibers becomes usually from 1/10 to 1/20, for example, from 0.1 to 1 mm, and typically from 0.1 to 0.5 mm.

The total content of polyamide resin and reinforcing fibers in the polyamide resin composition is typically 90 mass % or higher, and more typically 95 mass % or higher.

(3. Melt Flow Rate)

In the present invention, the melt flow rate (MFR) of the polyamide resin composition is controlled. The MFR changes depending on the molecular weight of the polyamide and the amount of reinforcing fibers in the composition. If the MFR is too low, owing to deterioration of flowability of the composition, the filling rate becomes poor when molded components for slide fasteners such as a slider are molded, resulting in lower yield, and prolonged mold cycle. On the contrary, when the MFR is too high, the strength of the composition deteriorates, the wide molecular weight distribution causes discontinuities in the flow and external defects, and the dimensional stability in summer environments deteriorates because of the moisture absorptivity of the polymer component. The MFR is preferably from 5 to 40 g/10 min, more preferably from 8 to 30 g/10 min, and even more preferably from 10 to 20 g/10 min. In the present invention, MFR is measured at 280° C. under a load of 2.16 kg in accordance with JIS K 7210 (Method A). When a resin composition with an MFR in this range is used, a molded component for a slide fastener having superior moldability and stable product quality can be manufactured at a high productivity. In light of the reinforcing fiber content described above, the molecular weight of the polyamide used in the present invention has to be relatively high in order to obtain an MFR in this range.

(4. Fatty Acid Salt)

Because the polyamide resin used in the present invention has to have a high molecular weight in order to obtain an MFR prescribed by the present invention, the polyamide resin itself tends to have a high viscosity and low fluidity. A combination of high viscosity and low fluidity leads to poor moldability. Wax may be added to improve fluidity and thus moldability, but the addition of wax reduces the strength and causes adhesiveness of the composition to tape to decline. Therefore, the present inventors conducted extensive research on additives that would improve moldability without causing a deterioration in strength. As a result, they discovered that moldability could be improved without compromising strength by adding a metal salt of an aliphatic acid having from 20 to 40 carbon atoms. They also discovered among these aliphatic acid metal salts, montanic acid metal salts are preferred. Examples of montanic acid metal salts include calcium montanate, sodium montanate, zinc montanate, lithium montanate, magnesium montanate, and aluminum montanate.

The aliphatic acid salt content is preferably from 0.1 to 2.0 parts by mass per 100 parts by mass in total of the polyamide resin and reinforcing fibers. When the content is no less than 0.1 parts by mass, the improvement to moldability is significant. When the content is no more than 2.0 parts by mass, bleedout over time as well as discoloration due to yellowing are prevented. The aliphatic acid salt content is more preferably from 0.3 to 1.0 parts by mass per 100 parts by mass in total of the polyamide resin and reinforcing fibers.

Commonly used additives such as heat stabilizers, weathering agents, hydrolysis stabilizers, antioxidants and other pigments can be introduced to the polyamide resin composition. For example, they may be added in a total amount at 10.0 parts by mass or less, typically 5.0 parts by mass or less, and more typically 2.0 parts by mass or less per 100 parts by mass in total of the polyamide resin and reinforcing fibers. When another pigment is added, a pigment having the desired Mohs hardness and refractive index mentioned above should constitute 90 mass % or more, preferably 95 mass %, and more preferably 100 mass % of the overall pigment.

(5. Slide Fastener)

An element for a slide fastener can be injection molded using the polyamide resin composition of the present invention. The element is usually injection molded continuously onto fastener tape, and a fastener stringer is manufactured in which the elements have been attached to the side edge of the fastener tape.

The following is an example of a method used to manufacture a fastener chain by injection molding an element onto tape using the resin composition of the present invention. First, a polyamide, reinforcing fibers, and an aliphatic acid, etc. are thoroughly kneaded to obtain a uniform resin composition. The kneading can be performed in a single-screw extruder, twin-screw extruder, or kneader, etc. When the kneaded resin composition has been injection molded onto tape using a mold with the desired shape, a fastener chain is obtained. The techniques used to manufacture a fastener chain by continuously injection molding a row of elements onto tape are well known in the art, so a detailed explanation is not required. Examples of these techniques have been disclosed in JP H02-036376A, JP S59-091906A, and JP S59-101334A. There are no particular restrictions on the tape material that can be used. Examples include chemical fibers such as polyesters, polyamides, polyolefins, polyethers, acrylics, and polyvinyls; cellulose-based natural fibers such as cotton and hemp; protein-based natural fibers such as wool and silk; and regenerated cellulose-based semi-synthetic chemical fibers such as Rayon and Cupra. From the standpoint of strength, heat resistance, dyeability, and cost, woven or knitted polyester fibers are preferred. There are no particular restrictions on the injection molding conditions. From the standpoint of maintaining high productivity without causing any deterioration in properties, the cylinder temperature is preferably from 10 to 60° C. above the melt point of the polyamide. For instance, this is from 235 to 285° C. in the case of Polyamide 6, from 235 to 285° C. in the case of Polyamide 610, and from 275 to 325° C. in the case of Polyamide 66. The mold temperature is preferably 10° C. or more above the glass transition point of the polyamide and at a temperature that does not scorch the tape. For instance, this is from 60 to 100° C. in the case of Polyamide 6, from 70 to 100° C. in the case of Polyamide 610, and from 80 to 100° C. in the case of Polyamide 66.

A pair of left and right fastener stringers are engaged together to create a fastener chain, and this can be combined with other components such as a slider to create a slider fastener. A slider fastener manufactured in this way can be attached to an opening part in various articles.

In order to increase the surface luster of the injected molded element of the present invention, the ten-point average roughness is preferably 6 μm or less, such as from 0.1 to 6 μm. The ten-point average roughness is measured using a laser microscope and a non-contact surface roughness measuring instrument.

The injection molded element can be dyed. There are no particular restrictions on the dyeing method. Dip dyeing and print dyeing are typical examples. There are no particular restrictions on the dye, but metal complex dyes, acid dyes, threne dyes, and disperse dyes are suitable and in particular acid dyes are especially suitable. They dyeing can be performed at the same time as the other components, or each component can be dyed separately.

EXAMPLES

The following is a more detailed explanation of the present invention and its advantages with reference to examples. The present invention is not limited to these examples.

The following were prepared as polyamide resins.

Nylon 6 (Amilan CM1007 from Toray, glass transition point: 50° C.)

Nylon 610 (Vestamid Terra HS 16 from Evonik, glass transition point: 60° C.)

Nylon 66 (Leona 1300S from AK Chem, glass transition point: 80° C.)

Nylon 6 (A1012 from Unitika, glass transition point: 50° C.)

The glass transition point of each polyamide resin was determined in accordance with JIS K 7121 using an Extar 6000 differential scanning calorimeter (DSC) from Seiko Instruments with the temperature rising at 10° C./min increments.

The following were prepared as reinforcing fibers.

Heat-resistant glass fibers (CS3J-459 from Nitto Boseki, fiber cross-sectional shape: φ11 μm (round profile), average fiber length before molding: 3.0 mm, average fiber length after molding 0.1 mm)

Flat glass fibers (CSG3PL-810S from Nitto Boseki, fiber cross-sectional shape: 14×7 μm (oval-shaped profile), average fiber length before molding: 3.0 mm, average fiber length after molding: 0.15 mm)

The following were prepared as additives.

Phenol-based antioxidant (Adeka Stab AO-80 from Adeka)

Phosphorus-based antioxidant (Adeka Stab PEP36 from Adeka)

Zinc stearate (Zn-St from Nitto Kasei Kogyo, number of carbon atoms: 18)

Polyethylene wax (Licowax PE520 from Clariant Japan, approx. molecular wt. 2,000)

Calcium montanate (CS-8 from Nitto Kasei Kogyo, number of carbon atoms: 28)

Sodium montanate (NS-8 from Nitto Kasei Kogyo, number of carbon atoms: 28)

The polyamide resins, glass fibers, and additives were kneaded together using a twin-screw extruder (TEM-18SS from Toshiba Machine Company) to obtain the formulations shown in Table 1 and Table 2 (mass basis), and the molten resin compositions were extruded as strands, which were solidified in a cold water tank. The strands were then pelletized to obtain pellets of the polyamide resin compositions in the examples and the comparative examples. Fastener chains were then manufactured at a cylinder temperature 20° C. above the melt point of polyamide, and at a mold temperature 20° C. above the glass transition point of polyamide using a fastener chain manufacturing device in which a number of element molds having fixed and movable molds were arranged and which were capable of continuously injection molding elements onto tape.

The resulting fastener chains were evaluated for the chain crosswise strength (JIS S 3015: 2007), element slippage (ASTM-D-2061), element pull-off (ASTM-D-2061), sliding resistance (JIS S 3015: 2007) and moldability. Moldability was evaluated by chain feedability was determined by the servo motor torque applied to the rollers when pulling products from the fastener chain manufacturing device. The following grades were assigned based on the maximum load when pulling the chain: "Good" for a maximum load less than 10 kg, "Fair" for a maximum load no less than 10 kg and less than 20 kg, and "Bad" for a maximum load no less than 20 kg. The results are shown in Table 1 and Table 2.

The melt flow rates (MFR) at 280° C. of the polyamide resin compositions in the examples and comparative examples were determined in accordance with RS K 7210 (Method A). The results are shown in Table 1 and Table 2.

TABLE 1

|  |  | Example 1 | Example 2 | Example 3 | Example 4 | Example 5 | Example 6 | Example 7 |
|---|---|---|---|---|---|---|---|---|
| Polymer | Amilan CM1007 (PA6) Tg50° C. | 50 | 50 | 40 | 50 | 50 | 50 | |
|  | VestamidTerraHS16 (PA610) Tg60° C. | | | | | | | 40 |
| Filler | CS3J-459 (Heat-Resistant Glass Fibers) | | 50 | 60 | 50 | 50 | 50 | 60 |
|  | CSG3PL-810S (Flat Glass Fibers) | 50 | | | | | | |
| Additives | AO-80 (Phenol-based Antioxidant) | 0.2 | 0.2 | 0.2 | 0.2 | 0.2 | 0.2 | 0.2 |
|  | PEP36 (Phosphorus-based Antioxidant) | 0.3 | 0.3 | 0.3 | 0.3 | 0.3 | 0.3 | 0.3 |
|  | Zinc Stearate | | | | | | | |
|  | Polyethylene Wax | | | | | | 0.1 | |
|  | Calcium Montanate | | | | 0.5 | | | |
|  | Sodium Montanate | | | | | 0.5 | | |
|  | MFR g/10 min (280° C.) | 16.9 | 10.6 | 6.7 | 15.3 | 13.9 | 12.1 | 14.5 |
|  | Chain Evaluation | | | | | | | |
|  | Chain Crosswise Strength | 690 | 724 | 760 | 782 | 785 | 674 | 642 |
|  | Element Slippage | 94 | 86 | 84 | 97 | 84 | 75 | 65 |
|  | Element Pull-off | 88 | 85 | 83 | 78 | 68 | 76 | 67 |
|  | Sliding Resistance | 5.2 | 4.0 | 3.9 | 4.2 | 3.7 | 4.0 | 2.8 |
|  | Moldability (Chain Feedability) | Fair | Fair | Fair | Good | Good | Fair | Fair |

TABLE 2

|  |  | Comp. Example 1 | Comp. Example 2 | Comp. Example 3 | Comp. Example 4 | Comp. Example 5 |
|---|---|---|---|---|---|---|
| Polymer | Amilan CM1007 (PA6) Tg50° C. | 30 | 70 | | 50 | |
|  | Leona 1300S (PA66) Tg80° C. | | | 40 | | |
|  | Unitika A1012 (PA6) Tg50° C. | | | | | 50 |
| Filler | CS3J-459 (Heat-Resistant Glass Fibers) | 70 | 30 | 60 | 50 | 50 |
|  | CSG3PL-810S (Flat Glass Fibers) | | | | | |
| Additives | AO-80 (Phenol-based Antioxidant) | 0.2 | 0.2 | 0.2 | 0.2 | 0.2 |
|  | PEP36 (Phosphorus-based Antioxidant) | 0.3 | 0.3 | 0.3 | 0.3 | 0.3 |
|  | Zinc Stearate | | | | 1 | |
|  | Polyethylene Wax | | | | | |
|  | Calcium Montanate | | | | | |
|  | Sodium Montanate | | | | | |

TABLE 2-continued

|  | Comp. Example 1 | Comp. Example 2 | Comp. Example 3 | Comp. Example 4 | Comp. Example 5 |
|---|---|---|---|---|---|
| Remarks | No Flow | Low Strength | Tape Undulation | Low Strength | Low Strength |
| MFR g/10 min (280° C.) | 0.7 | 18.9 | 5.2 | 46.9 | 42.2 |
| Chain Evaluation | | | | | |
| Chain Crosswise Strength | N/A | 556 | 841 | 597 | 593 |
| Element Slippage | N/A | 92 | 76.4 | 67 | 79 |
| Element Pull-off | N/A | 67 | 87.5 | 93 | 85 |
| Sliding Resistance | N/A | 4.9 | 5.8 | 3.5 | 3.7 |
| Moldability (Chain Feedability) | Bad | Good | Fair | Good | Fair |

(Observations)

Examples 1-7 had superior properties in terms of strength, tape undulation, and moldability. Examples 4-5 included a montanic acid salt, and had better strength in addition to the improvement in moldability. On the contrary, in Comparative Example 1, the glass fiber content was too high and the MFR was too low, the moldability was deteriorated and a chain fastener could not be manufactured. The glass fiber content was too low in Comparative Example 2, and the resulting elements had insufficient strength. A polyamide with a high glass transition point was used in Comparative Example 3, so the molding temperature had to be increased. This caused tape undulation. The MFR was too high in Comparative Example 4, and sufficient strength could not be obtained. The MFR of the polyamide itself used in Comparative Example 5 was high (that is, the molecular weight was low), so the overall MFR became higher, and sufficient strength could not be obtained.

REFERENCE SIGNS LIST

10: Slide fastener
11: Tape strip
12: Element
13: Slider
14: Top stop
15: Opening device
16: Pull tab

The invention claimed is:

1. An injection molded element for a slide fastener having as a material a polyamide resin composition containing a polyamide resin having a glass transition temperature from 40 to 70° C., the material excluding polyester resin,
   the composition having a melt flow rate from 5 to 40 g/10 min measured at 280 degrees C. under a load of 2.16 kg according to JIS K 7210 (Method A), and containing from 40 to 60 parts by mass of reinforcing fibers per 100 parts by mass in total of the polyamide resin and reinforcing fibers.

2. The injection molded element according to claim 1 further containing a metal salt of a fatty acid having from 20 to 40 carbon atoms.

3. The injection molded element according to claim 2, wherein the fatty acid salt is a montanic acid salt.

4. The injection molded element according to claim 2, wherein the fatty acid salt content is from 0.1 to 2.0 parts by mass per 100 parts by mass in total of the polyamide resin and reinforcing fibers.

5. The injection molded element according to claim 1, wherein the melt flow rate is from 10 to 20 g/10 min.

6. The injection molded element according to claim 1, wherein the polyamide resin is at least one type selected from among Nylon 6 and Nylon 6, 10.

7. The injection molded element according to claim 1, wherein the reinforcing fibers are at least one type selected from among glass fibers, carbon fibers, and aramid fibers.

8. A fastener chain comprising the injection molded element according to claim 1.

9. A slide fastener comprising the injection molded element according to claim 1.

10. An article comprising the slide fastener according to claim 9.

* * * * *